United States Patent [19]

Miller

[11] 3,895,988

[45] July 22, 1975

[54] METHOD OF MAKING INLAID RESINS
[75] Inventor: Everett R. Miller, Dennisport, Mass.
[73] Assignee: Owens-Corning Fiberglas Corporation, Toledo, Ohio
[22] Filed: May 25, 1973
[21] Appl. No.: 364,215

Related U.S. Application Data
[62] Division of Ser. No. 146,266, May 24, 1971, Pat. No. 3,752,690.

[52] U.S. Cl. ............ 156/245; 117/8; 117/9; 117/16; 156/276
[51] Int. Cl. .............................. B44c 1/20
[58] Field of Search ......... 156/62.2, 87, 179, 189, 156/209, 212, 213, 214, 219, 220, 229, 242, 245, 276, 285, 286; 117/8, 10, 11, 16, 25, 29, 9

[56] References Cited
UNITED STATES PATENTS
| | | | |
|---|---|---|---|
| 2,838,416 | 6/1958 | Babiarz et al. | 117/10 |
| 3,271,215 | 9/1966 | Hoffman | 156/276 |
| 3,615,979 | 10/1971 | Davis | 156/179 |

*Primary Examiner*—Caleb Weston
*Attorney, Agent, or Firm*—Carl G. Staelin; John W. Overman; Ralph J. Skinkiss

[57] ABSTRACT

A bottom carrier sheet of material having memory is passed over a roll having depressions therein, and a curable resin under pressure forces the sheet into the depression and fills the depressions in the sheet material. Excess resin is scraped from the sheet leaving the resin which fills the depressions in place. The sheet is then removed from the roll and caused to assume a flat condition to move the resin up out of the depressions and provide raised indicia of the configuration of the depressions. Indicia of different colors can be added in like manner, and finally a film of resin is flowed around and over the raised indicia. The film of resin is covered by a top sheet of separation material and the composite sandwich of resin and top and bottom separation sheets are rolled into a package and cured to produce a sheet molding compound.

3 Claims, 5 Drawing Figures

PATENTED JUL 22 1975　3,895,988

SHEET 1

METHOD OF MAKING INLAID RESINS

This is a division of application Ser. No. 146,266, filed May 24, 1971, now U.S. Pat. No. 3,752,690.

BACKGROUND OF THE INVENTION

The prior art has known to print indicia onto a carrier sheet using printing rolls having raised surfaces. The prior art has thereafter applied a layer of resin over the printing, has placed a cover sheet over the resin, and has cured the printed resin into sheets. In some instances the prior art has applied inks to embossed carrier sheets by using conventional printing rolls having raised surfaces, or by using stencils, or silk screen techniques etc. These inks of necessity must be quite fluid and the thickness of the printing quite thin, so that the wearing qualities of the product are limited to the life of a thin surface layer. Obviously, thick layers of indicia cannot be deposited using conventional printing techniques. The art has also known to permanently emboss a carrier sheet and fill depressions therein to produce an embossed article, as opposed to an inlaid material.

An object of the present invention is the provision of a new and improved method of producing sheets of plastic material having inlaid colored indicia of an appreciable thickness.

A further object of the invention is the provision of a new and improved sheet molding compound, the resin of which has inlaid indicia, and which molding compound can be pressed and cured in conventional manner to produce a molded object having inlaid colored areas.

A still further object of the invention is the provision of a new and improved process for producing sheet plastic having different colored inlays therein.

Further objects and advantages of the invention will become apparent to those skilled in the art to which the invention relates from the following description of preferred embodiments described with reference to the accompanying drawings.

DESCRIPTION OF THE PREFERRED EMBODIMENTS

Figures 1, 2, 3, 4:
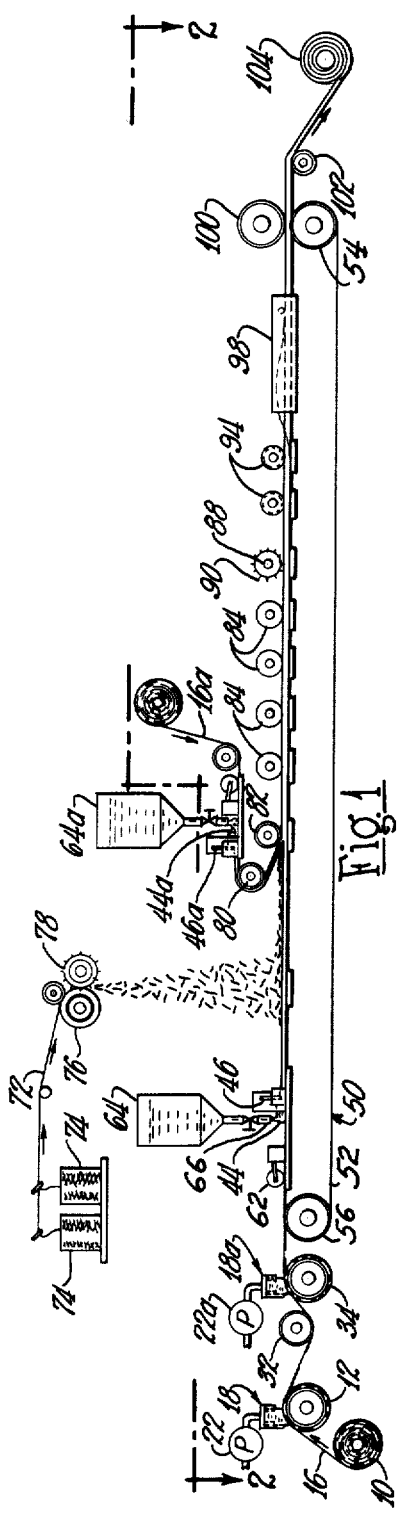
FIG. 1, is an elevational view of apparatus for making sheet molding compound and which embodies principles of the present invention.
FIG. 2, is a plan view taken approximately on the line 2—2 of FIG. 1.
FIG. 3, is a fragmentary sectional view through the first inlay producing roll shown in FIGS. 1 and 2.
FIG. 4, is a fragmentary sectional view through the second inlay producing roll shown in FIGS. 1 and 2.

While principles of the present invention can be used to produce inlaid plastic articles of all types including linoleum, the invention is herein shown and described as embodied in a process for making sheet molding compound, which in turn can be used to produce molded inlaid articles of all types.

According to principles of the invention, a resilient sheet material having "memory," as for example a previously stretched polyethylene film is uncoiled from a roll 10 and passed over the top of an indicia forming roll 12. The indicia forming roll 12 has depressions 14 therein corresponding to the indicia to be formed in the sheet molding compound, and the polyethylene film 16 is caused to engage the top surface of the roll 12 beneath a resin box 18. The resin box 18 can be of any suitable type adapted to confine resin onto the sheet 16 above the roll 12, and preferably is of a type capable of supplying sufficient pressure to force the polyethylene film 16 down into the depressions 14 in the roll 12. Alternatively, suction within the roll can be used to suck the polyethylene film down into the depression 14.

In the preferred embodiment shown, the resin box 18 is enclosed and is supplied with resin of high viscosity by means of a metering pump 22. The resin box 18 has side surfaces adapted to closely engage the polyethylene film while in contact with the roll. In the embodiment shown in the drawings, the side surfaces of the box 18, are made of a relatively stiff plastic which in the present instance is Teflon to prevent scratching of the polyethylene film 16. Teflon sheets 24 and 26 are sandwiched between metal plates 28 to form the front and rear sides of the box, respectively. The front Teflon sheet 24 acts as a doctor blade which removes all of the resin except that filling the portions of the polyethylene lying within the depressions 14, and the rear Teflon sheet 26 prevents escape of the resin over the portion of the sheet approaching the box. In the present instance the pressure from the pump 22 is utilized to force the polyethylene down into the depressions 14 while at the same time cause the depressions in the polyethylene sheet to be filled with resin. The polyethylene film now having resin deposited thereon in the shape of the indicia forming depressions 14 is caused to leave roll 12 in a generally horizontal position. The memory of the polyethylene film causes the film to return to a flat condition and leave the resin as raised areas having the shape of the depressions 14. If only a single kind of indicia is required, a background resin can be flowed over and around the indicia 30. In those instances where a second type of indicia is to be provided, the polyethylene film 10 with the indicia 30 thereon is passed beneath a curvature reversing roll 32 having depressions therein which receive the indicia 30. The polyethylene film with the indicia 30 thereon is passed to a second indicia forming roll 34. The indicia forming roll 34 is similar to the indicia forming roll 12 and has depressions 36 therein that receive the indicia 30 and include still other areas. Where the second indicia are to abut or surround the first indicia 30, the depressions 36 in the roll 34 are larger than the indicia 30 to receive the second color of resin in areas adjoining the indicia 30. FIG. 4 shows the depression 36 extending forwardly of the indicia 30 to receive the second resin 38 in abutment with the forward edge of the indicia 30. The second resin 38 is forced into the leading portion 40 of the depression 36 from a second resin box 18a that is identical to that previously described. Those portions of the resin box 18a which correspond to the resin box 18 are designated by a like reference numeral characterized further in that a suffix a is affixed thereto.

The depression 40 is deeper than the depression 14. Resin from the box 18a forces the polyethylene film down into the depressions 40. If the depressions 40 are larger than the depressions 14, additional resin is deposited adjacent the indicia 30. Where the indicia 30 is to be separated from the second indicia, the depression 40 corresponds in configuration to the depression 14. In order not to move or disturb the first formed indicia 30, the depressions 40 are slightly deeper than the depressions 14 and the doctor blade 24a clears the top of the indicia 30. In addition, the viscosity of the resin 38 is preferably considerably less than the viscosity of the resin 20, so that the second resin will flow around and over the first indicia without displacing the more viscous resin of the first indicia 30.

It will be seen that the indicia forming rolls 12 and 34 as well as the curvature reversing roll 32 must be driven in precise relation to each other in order that the indicia 30 will be received within the depressions of the rolls 32 and 34. These rolls are driven by adjustable drive mechanism, not shown, of the type used in newspaper and the like printing machinery.

The polyethylene film having the indicia newly formed thereon moves away from the roll 34 in a generally horizontal direction. This allows the polyethylene film to assume a generally flat condition causing the indicia 30 and 42 to move upwardly out of the sheet material 10. The balance of the resin required to form the facing for the sheet molding compound is applied by flowing a resin 44 over the top of the sheet, including the indicia 30 and 42 using a doctor blade 46 that is spaced upwardly from the indicia. Thereafter glass fiber reinforcing, and back-up resin are added in any suitable manner, and in the preferred arrangement, are added by the apparatus shown and described in the Davis et al. application Ser. No. 741,677 filed July 1, 1968.

The apparatus shown in the drawings for completing the sheet molding compound comprises an endless belt conveyer 50, the belt 52 of which extends around head and tail pulleys 54 and 56 respectively. The sheet material 16 having the indicia 30 and 42 thereon is pulled on to the conveyer 50 and is contacted by a pair of sheet smoothing rolls 62, respective ones of which are positioned adjacent respective sides of the sheet. The smoothing rolls pull the opposite sides of the sheet 16 apart to pull the sheet 16 into a flat condition and assure that the indicia 30 and 42 are raised up out of the plane of the sheet. Thereafter the facing resin 44 is flooded onto the sheet from the reservoir 64 by a plurality of nozzles 66, following which the resin is contacted by the doctor blade 46 which smooths the resin to a thickness of approximately ⅛ inch. The doctor blade 46 includes edge guides 70 which prevent the resin from coating one inch edge portions of the sheet.

Strands 72 of glass fibers from the packages 74 are pulled over a rubber roll 76 that is engaged by another roll 78 having projecting bars or blades which force the strands 72 into the rubber surface to break the strand into lengths of approximately ½ inch. The chopped fibers fall upon the resin layer to provide a layer of fibers approximately ½ inch thick. Another strip of sheet material 16a is uncoiled from a roll and is advanced towards the area of fiber deposition from the direction opposite that of the product conveyer movement.

The sheet 16a is coated with a layer of molding resin in the same manner previously described for the sheet 16. The parts of the coating apparatus for the sheet 16a which correspond to similar parts of the coating apparatus of the sheet 16 are designated by a like reference numeral characterized further in that a suffix a is affixed thereto. The sheet 16a with a ⅛ inch thick resin coating thereon passes around an idler roll 80 which changes the direction of the movement of the sheet 16a to correspond with that of the sheet 16. The sheet 16a with the resin now on its bottom surface is forced down on top of the chopped fibers by a squeeze roll 82. The sandwich formed by the two sheets, with the resin and chopped fibers therebetween, is then passed beneath a plurality of disks 84 which roll along the top sheet 16a to work the resin into the fibers. In the embodiment shown in the drawings, four rows of disks are provided, and each row is concentrically supported on a shaft 86 suitably journaled for rotation. The composite sandwich, thereafter, passes beneath a roll 88 having needle shaped projections 90 thereon which are forced through the sheet 16a and into the layer of fibers. The holes 92 made by the projections 90 allow air that is trapped in the fibers to escape, and thereafter, the sandwich is passed beneath a pair of ridge rolls 94, the ridges of which generally straddle the holes 92 to move the air from the fibers out through the holes 92. The uncoated edge portions of the sheets 16 and 16a are turned over by a pair of folding shoes 98, and the sandwich thereafter is advanced between a pressure roller 100 positioned above the head pulley 54 to provide uniform pressure on the sandwich and squeeze it into a uniform thickness. Thereafter the sandwich passes over the idler roll 102 and is wound into a coiled package 104, by controlled tension of between ¾ and 1 pound per linear inch of sandwich for compaction and wet out.

The present invention can be used to make inlaid materials from any type resinous material, be it thermoplastic or thermosetting, using suitable pastes of solids or liquids. In the preferred embodiment, a sheet molding compound is made using unsaturated polyester resins which are caused to link-up linearly during storage at room temperature into a thermoplastic condition using an alkaline earth metal oxide. The sheet molding compound also includes a free radical catalyst which causes the olefinic double bonds of the resin to cross link to a thermoset condition during molding.

By way of example, the facing resin 44 comprises:

| Material | % by Wt. |
|---|---|
| UNSATURATED POLYESTER RESIN | 42.7 |
| 1 mol phthalic anhydride, 1 mol maleic anhydride, 2 mols propylene glycol cooked to an acid number of 35 | |
| CROSS LINKING CATALYST | |
| (Dicumyl peroxide) | 0.85 |
| 2,5-dimethyl hexyl-2,5- di (peroxybenzoate) | 0.09 |
| MOLD RELEASE AGENT | 1.71 |
| (Zinc stearate) | |
| GELLING AGENT | 1.28 |
| Ca(OH)$_2$ | |
| SOLVENT | 4.27 |
| Styrene | |
| FILLER | |
| Resin type (microethylene) | 6.4 |
| Nonresinous filler (CaCO$_3$) | 43.7 |

This material has a viscosity of approximately 20,000 centipoise. The resin 38 for the second indicia corresponds to the paste given above except that Fe$_2$O$_3$ is used for the non resinous filler and the solvent and filler are proportioned to give a viscosity of approximately 45,000 centipoise. The resin paste 20 has generally the same composition as that of the resin 44 excepting that part of the calcium carbonate is replaced with carbon black to give a gray color, and solvent is deleted to give a viscosity of approximately 90,000 centipoise. The preferred alkaline earth metal oxide containing materials for thickening polyester resins into linear chains includes CaO, MgO and hydrates thereof.

Figure 5:
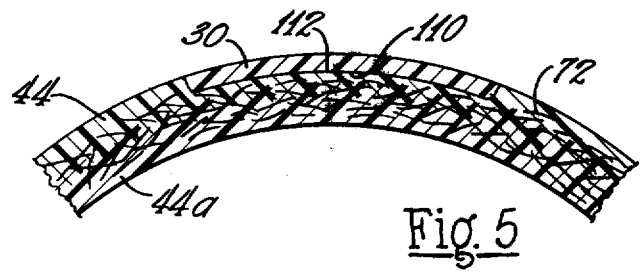
FIG. 5, is a fragmentary sectional view through a contoured molded article produced by molding the inlaid sheet molding compound of the invention between heated matched metal dies.

The sheet molding compound 104 is cured at room temperature for a sufficient length of time for the polyester resins to become linked linearly to a nonsticky, flexible condition wherein it can be handled as a sheet. The material thereafter is sometimes called "B-staged," since the process is similar to that which occurs during the B-staging of a phenol formaldehyde resin. Thereafter, the polyethylene carrier sheets 16 and 16a are removed, and the sheet molding compound is placed between matched metal dies that are heated to a temperature of approximately 300°F. and is pressed into a desired configuration. Heating in the dies causes the cross-linking catalyst to produce free radicals which in turn cause a cross-linking of the unsaturated bonds of the polyester resin, so that the resin is changed to a thermoset condition. FIG. 5 of the drawings is a fragmentary sectional view of a contoured thermoset article so produced.

The outer layer of the molded article of FIG. 5 is formed by the resin 44, and contains a depression 110, the bottom 112 of which is generally parallel to the outer surface, and the sidewalls of which are generally perpendicular to the outer surface. The indicia forming material 30 fills the depression 112 and has its outer surface flush with the outer surface of the surface resin layer 44. The fibers 72 are forced into the back of the layer 44, and into the adjoining areas of the backing resin 44a so that the fibers reinforce the entire molded article.

It will now be seen that the sheet molding compound, when it is cured, forms a molded article, be it flat or contoured, having an inlay of an indicia producing resin of appreciable thickness. This thickness will usually be more than 5 mils thick, and is preferably 10 to 15 mils thick. Inlays of considerably greater thickness can be produced. By way of example, where an inlay having five different colors abutting each other is produced, and each color has a thickness of 12.5 mils, the indicia will have a total thickness of 0.0625 inch and may or may not be reinforced with fibers. When reinforced with fibers, a backing layer of resinous material having approximately the same thickness as the facing layer will usually be used, so that the fibers uniformly reinforce both the facing and backing layers.

While the invention has been described in considerable detail, I do not wish to be limited to the particular embodiments shown and described, and it is my intention to cover hereby all novel adaptations, modifications, and arrangements thereof which come with the practice of those skilled in the art to which the invention relates.

I claim:

1. In a method of producing a continuous sheet of moldable fiber reinforced resinous compound having a decorative inlay, the steps of:
   a. passing a carrier sheet having a memory over a first surface having a depression therein,
   b. causing said carrier sheet material to be moved down into said depression taking the form thereof,
   c. depositing a resinous material into the resulting carrier sheet depression,
   d. causing said carrier sheet to return to a generally flat condition leaving a raised area of resinous material thereon,
   e. depositing a second layer of resinous material atop said carrier sheet such that said second layer is flowed around and over said raised area of resinous material producing a continuous sheet of resinous material in which said raised area becomes an inlay,
   f. applying fiberous reinforcement over the top of said sheet of resinous material,
   g. applying a second carrier sheet having a coating of resinous material thereon over said fiberous reinforcement to produce a continuous sheet of fiber reinforced moldable compound between said two carrier sheets.

2. The method of claim 1 wherein said resinous material includes a cross linking agent for converting the resinous material into a thermoplastic condition at a low temperature plus a cross linking catalyst for cross linking the resinous material at a high temperature.

3. The method of claim 2 wherein said resinous materials are polyester resins and said cross linking agent for converting the resins to a thermoplastic condition are selected from the group consisting of CaO, MgO, and hydrites thereof.

* * * * *